United States Patent
Morgan et al.

(10) Patent No.: US 8,231,128 B2
(45) Date of Patent: Jul. 31, 2012

(54) INTEGRAL SEAL AND SEALANT PACKAGING

(75) Inventors: Victor John Morgan, Simpsonville, SC (US); Benjamin Paul Lacy, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/752,380

(22) Filed: Apr. 1, 2010

(65) Prior Publication Data

US 2011/0241297 A1    Oct. 6, 2011

(51) Int. Cl.
*F16J 15/12*  (2006.01)
*B32B 9/00*   (2006.01)
*B32B 33/07*  (2006.01)

(52) U.S. Cl. ........ 277/316; 277/641; 277/652; 277/654; 428/40.1; 428/40.5; 428/40.9

(58) Field of Classification Search ............... 277/641, 277/652, 654, 316; 428/40.1, 10.5, 40.9, 428/41.1
See application file for complete search history.

(56) References Cited

U.S. PATENT DOCUMENTS

| | | | | |
|---|---|---|---|---|
| 2,924,471 A * | 2/1960 | Poltorak et al. | ............... | 428/591 |
| 3,020,185 A * | 2/1962 | Moffitt, Jr. et al. | ........... | 428/365 |
| 3,476,842 A | 11/1969 | Renwick | | |
| 4,220,342 A * | 9/1980 | Shah | ............................ | 277/654 |
| 4,540,183 A | 9/1985 | Schneider et al. | | |
| 5,407,214 A | 4/1995 | Lew et al. | | |
| 5,509,669 A * | 4/1996 | Wolfe et al. | .................... | 277/654 |
| 5,657,998 A | 8/1997 | Dinc et al. | | |
| 5,716,052 A * | 2/1998 | Swensen et al. | ............... | 277/647 |
| 5,934,687 A * | 8/1999 | Bagepalli et al. | ............. | 277/637 |
| 6,162,014 A * | 12/2000 | Bagepalli et al. | .......... | 415/170.1 |
| 6,446,979 B1 * | 9/2002 | Steinetz et al. | ................ | 277/630 |
| 6,637,752 B2 * | 10/2003 | Aksit et al. | .................... | 277/416 |
| 6,648,333 B2 * | 11/2003 | Aksit et al. | .................... | 277/316 |
| 6,655,913 B2 * | 12/2003 | Vedantam et al. | .......... | 415/214.1 |
| 6,659,472 B2 * | 12/2003 | Aksit et al. | .................... | 277/647 |
| 6,764,081 B2 * | 7/2004 | Mohammed-Fakir et al. | ............................. | 277/637 |
| 7,040,857 B2 * | 5/2006 | Chiu et al. | ........................ | 415/1 |
| 7,367,567 B2 * | 5/2008 | Farah et al. | .................... | 277/650 |
| 2005/0232772 A1 | 10/2005 | Race et al. | | |

FOREIGN PATENT DOCUMENTS

DE    20023961 U1    12/2007
EP    1327801 A2    7/2003

OTHER PUBLICATIONS

Search Report from corresponding EP Application No. 11100722.2-1252 dated Jul. 26, 2011.

* cited by examiner

*Primary Examiner* — Alison Pickard
(74) *Attorney, Agent, or Firm* — Nixon & Vanderhye, P.C.

(57) ABSTRACT

An integral seal and sealant package includes a prefabricated seal element having multiple surfaces; a high-temperature sealant composition engaged with one or more of the multiple surfaces; and a backer material enclosing the prefabricated seal element and the high-temperature sealant composition. The backer material has composition permitting the backer material to be installed with the seal element and the sealant composition between adjacent components to be sealed.

10 Claims, 2 Drawing Sheets

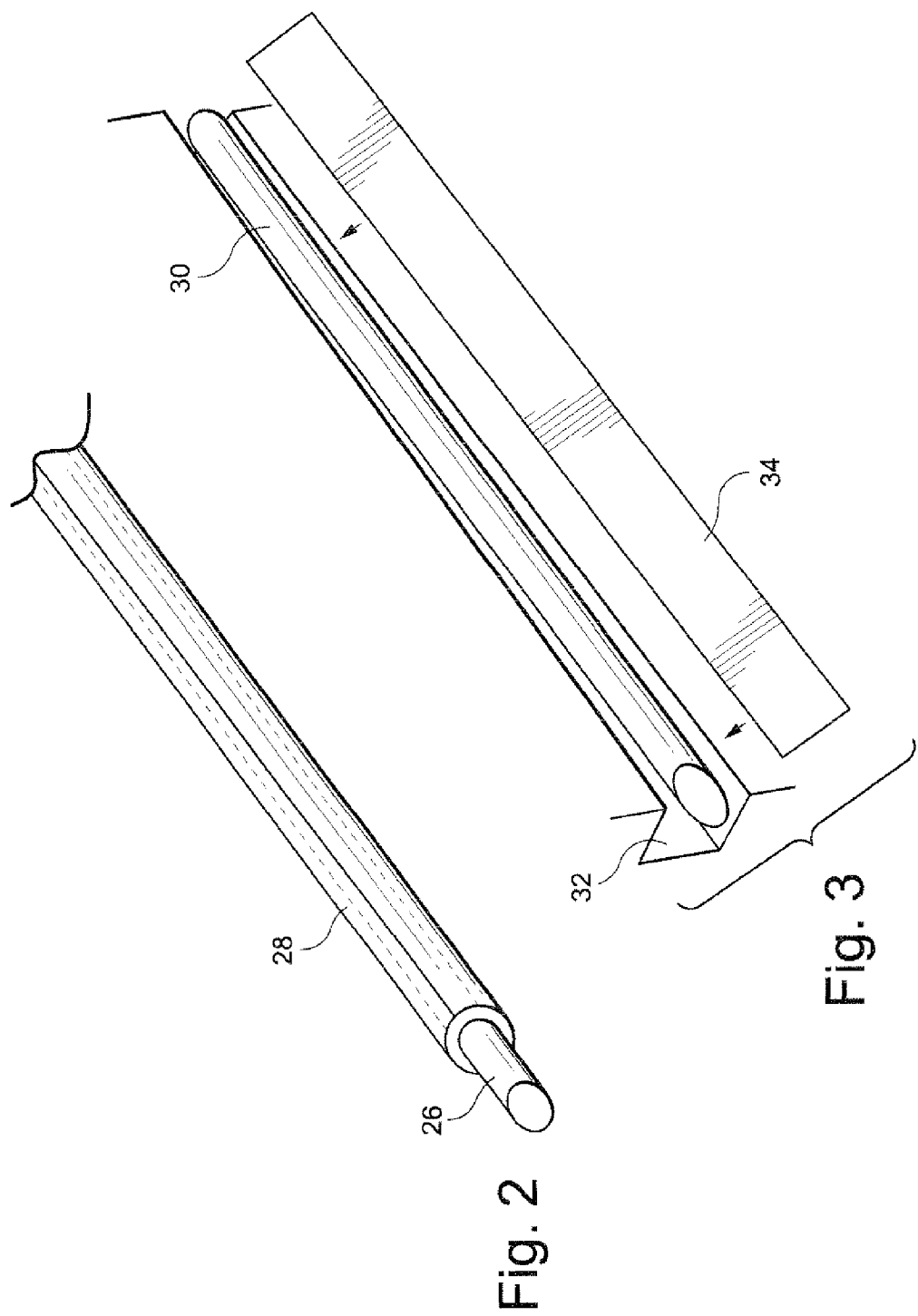

INTEGRAL SEAL AND SEALANT PACKAGING

BACKGROUND OF THE INVENTION

The invention relates to static seals for use in turbine machines and, specifically, to a prepackaged seal and sealant configuration for use in gas turbine seal slots.

In current practice, solid or cloth seals are often used in static seal arrangements in certain gas turbine components. One such cloth seal is described in commonly-owned U.S. Pat. No. 5,657,998. There has been some thought about utilizing cloth or other hard seals in combination with high temperature sealants. There is a concern, however, that application of the sealant with a caulk gun or some other uncontrolled means may well result in the sealant material being applied incorrectly, and/or in the wrong locations. It would be desirable, therefore, to devise a more reliable and effective approach to the application of seals and associated sealants that not only facilitates the installation process, but that also increases the robustness of the seals.

BRIEF SUMMARY OF THE INVENTION

In accordance with a first exemplary but nonlimiting embodiment, the present invention provides an integral seal and sealant package comprising: a prefabricated seal element having multiple surfaces; a high-temperature sealant composition engaged with one or more of the multiple surfaces; and a backer material enclosing the prefabricated seal element and the high-temperature sealant composition, the backer material having a composition permitting the backer material to be installed with the seal element and the sealant composition between adjacent components to be sealed.

In another exemplary but nonlimiting embodiment, there is provided an integral sealant package for insertion between adjacent turbine components comprising a high-temperature sealant composition formed as an elongated strip at least partially wrapped in a film suitable for placement with the sealant composition in a sealing environment.

In still another exemplary but nonlimiting aspect, there is provided a method of installing an integral seal and sealant between a pair of adjacent components in a turbine machine comprising cutting a seal element to a desired size and shape; laying the seal element on a backer sheet comprised of a material that will burn away at a temperature less than a specified service temperature of the adjacent components; applying a high-temperature sealant to at least one or more sides of the seal element; wrapping the backer sheet about the seal element so as to substantially completely enclose the seal element and the high-temperature sealant, thereby forming an integral seal and sealant package; locating the integral seal and sealant package in position between the pair of adjacent components; and operating the turbine machine so that the adjacent components reach the specified service temperature, and causing the backer material to melt and/or burn away, leaving the seal element and the high-temperature sealant in place.

The invention will now be described in connection with the drawings identified below.

BRIEF DESCRIPTION OF THE DRAWINGS

FIG. 2 is a perspective view of a preformed sealant composition wrapped in a thin film in accordance with another exemplary but nonlimiting embodiment of the invention; and FIG. 3 is an exploded view illustrating a preformed sealant material within a seal slot prior to installation of the seal element itself.

DETAILED DESCRIPTION OF THE INVENTION

Figure 1:
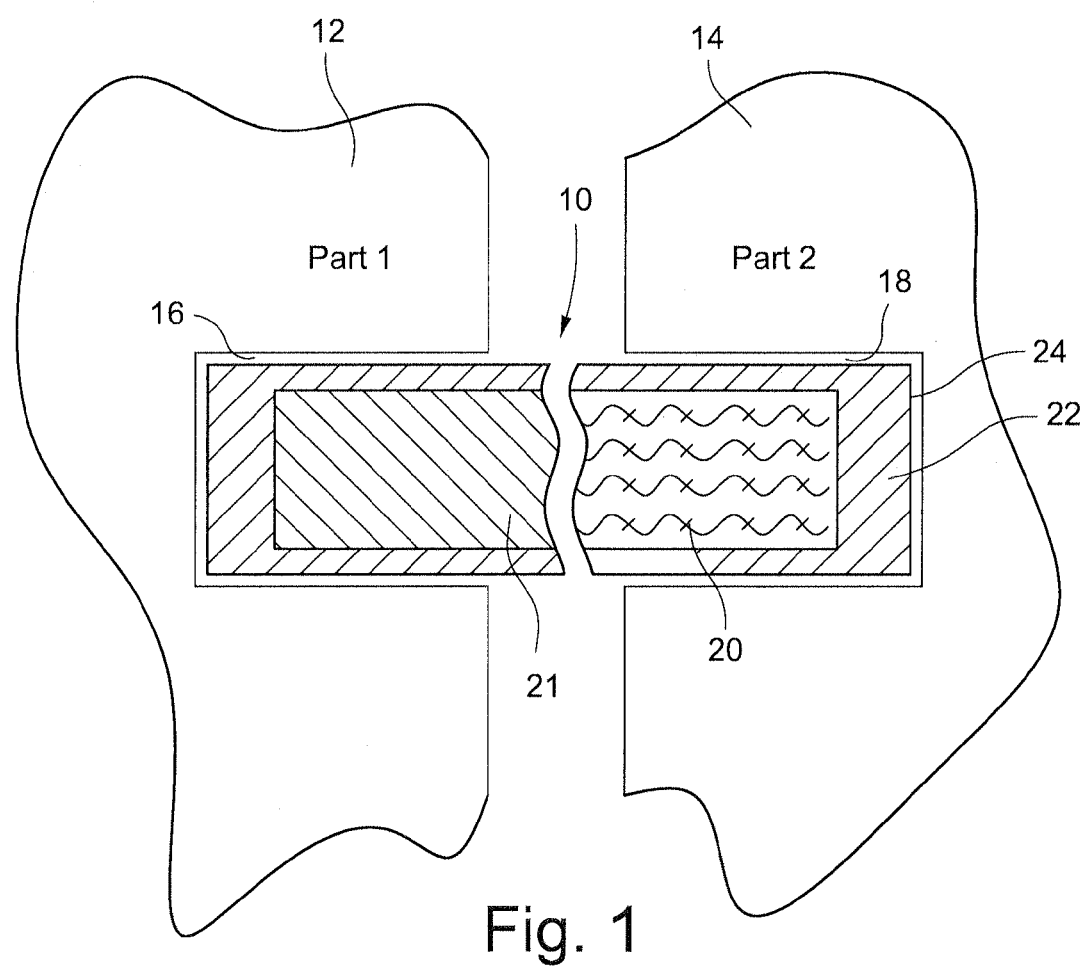
FIG. 1 is a schematic cross section illustrating alternative embodiments of a prepackaged seal and sealant assembly located within adjacent seal slots formed in adjacent gas turbine components in accordance with an exemplary but nonlimiting embodiment of the invention.

Referring to FIG. 1, a seal and sealant package 10 in accordance with an exemplary but non-limiting embodiment is shown located in situ between a pair of machine components 12 and 14. The split format of the figure is merely intended to show alternative seal materials as explained further below The components may be, for example, turbine nozzles or shrouds formed to include aligned seal slots 16, 18. The seal and sealant package may include a seal element 20, sealant material 22 and a surrounding packing membrane or enclosure 24 (also referred to herein as a backer material).

More specifically, the seal element 20 may be an otherwise conventional hard or cloth seal typically used in turbine applications where static seals are employed in combination with high temperature sealant. Hard seals generally refer to relatively thick metal shims (see, for example, shim 21 in FIG. 1), while cloth seals may be a composite assembly of metal foil layers wrapped in overlying layers of cloth, as described, for example, in commonly-owned US Pat. No. 5,657,998.

The sealant material 22 may be any suitable high-temperature sealant that resists temperatures up to about 2000° F. and that is otherwise compatible with the seal slot surface material.

The surrounding enclosure or membrane 24 (also referred to herein as a "backer material") may be composed of wax paper, plastic film or other suitable material with properties or characteristics that will cause the backer material to melt and/or burn away at temperatures lower than the service temperature of the sealed components. The backer material must be suitably thin, inexpensive, and leave no residue.

An exemplary but nonlimiting manufacturing/assembly and use of the seal and sealant package will now be described. Initially, the cloth or hard seal element 20 is prefabricated and cut to the required assembled length and width. A suitable seal element is described, for example, in commonly-owned U.S. Pat. No. 5,657,998. The seal element 20 is laid on the backer material 24, and a line of the high temperature sealant material 22 is applied around the still exposed sides of the seal element 20. The backer material 24 is wrapped around the sides, ends and top of the seal element 20 to completely enclose the seal element and sealant material 22. Any openings or loose overlaps in the backer material may be sealed separately (simply by heating, for example) to protect, and to prevent escape of the sealant material 22. At this point, depending on the application, it may be necessary to press or massage the sealant material 22 within the package into a shape that will facilitate insertion of the package into the seal slot or recess in which it is to be used (for example, the slots 16, 18 formed in the adjacent turbine components 12, 14) and that will locate the sealant at the required locations. In this regard, it may be sufficient to simply insure that the sealant extend along one or more edges and/or one or more sides of the seal. In other applications, it may be necessary to manipulate the package to insure sealant coverage on all sides and edges of the seals.

The seal and sealant package 10 can then be shipped to a machine assembly plant or field installation site where it is installed. Upon start-up of the machine, and after reaching the critical temperature (the temperature at which the backer material melts and/or burns), the backer material 22 will melt and/or burn away, leaving no residue but leaving the high-temperature sealant 20 in its design location.

In another exemplary but nonlimiting embodiment, the sealant material may be preformed and wrapped partially or completely in a non-stick, removable plastic (or other suitable material) film (or backer material) for later application to a seal slot with an associated seal. In FIG. 2, for example, a pre-rolled sealant "cylinder" 26 is wrapped in a non-stick, removable film or backer material 28, which in turn, can be rolled into a bundle for shipment and/or storage. When ready for use, discrete strips 30 may be cut to length and pushed into the seal slots. The film 28 may be partially removed to allow the sealant to be pressed into place, followed by complete removal of the film and insertion of the seal element. Alternatively, the entire film 28 could be removed in advance of the sealant strip 30 being pressed into its respective seal slot as shown in FIG. 3.

As an additional alternative, after a non-covered strip 30 of sealant is located within a seal slot 32, the exposed portion of the sealant may be covered with a non-stick removable film 28. When ready to install the seal element 34, the film 28 would be removed and the seal element 34 pressed into place directly against the sealant 30.

It will be appreciated that the non-stick film 28 could also remain on the sealant strip 30 (including completely covering the sealant strip) and/or between the sealant strip 28 and the seal 20, to be melted or burned off before the sealed components reach their service temperature.

The film 28 need not be of the non-stick variety in that, for some applications, it may be desirable to have a tacky film to provide some degree of adhesion to the sealant.

It will be appreciated that the seal and sealant package 10 could be used during initial gas turbine or other machine assembly, or incorporated as part of an up-rate package for gas turbine or other engines.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. An integral seal and sealant package comprising:
a prefabricated seal element having multiple surfaces;
a flexible, high-temperature sealant composition applied to said multiple surfaces wherein said high temperature sealant composition resists temperatures up to 2000° F.; and
a backer material enclosing said prefabricated seal element and said flexible, high-temperature sealant composition, said backer material having a composition permitting the backer material to be installed with said seal element and said flexible high-temperature sealant composition between adjacent components to be sealed, and wherein backer material is selected to have characteristics that will cause the backer material to burn or melt at a temperature less than a specified service temperature of said components to be sealed.

2. The integral seal and sealant package of claim 1 wherein said seal element is a cloth seal.

3. The integral seal and sealant package of claim 1 wherein said seal element is a relatively hard metal shim.

4. The integral seal and sealant package of claim 1 wherein said seal element is substantially rectangular in shape, said multiple surfaces including four side edges, a top surface and a bottom surface.

5. The integral seal and sealant package of claim 1 wherein said seal element is a cloth seal; said backer material comprises a material chosen from a group comprising wax paper and plastic tape.

6. A method of installing an integral seal and sealant package between a pair of adjacent components in a turbine machine comprising:
(a). cutting a seal element to a desired size and shape;
(b). laying the seal element on a backer sheet comprised of a plastic non-stick or tacky film that will burn away at a temperature less than a specified service temperature of said adjacent components;
(c). applying a flexible, high-temperature sealant composition serviceable up to 2000° F. to at least two surfaces of said seal element;
(d). wrapping said backer sheet about said seal element to substantially completely enclosing said seal element and said flexible, high-temperature sealant, thereby preventing escape of said flexible, high temperature sealant and forming an integral seal and sealant package;
(e). locating said integral seal and sealant package in position between said pair of adjacent components; and
(f). operating the turbine machine so that said adjacent components reach said specified service temperature, and causing said backer material to melt and/or burn away, leaving said seal element and said flexible, high-temperature sealant composition in place.

7. The method of claim 6 wherein said seal element is a cloth seal.

8. The method of claim 6 wherein said seal element is a relatively hard metal shim.

9. The method of claim 6 wherein said seal element is substantially rectangular in shape, and wherein said at least two surfaces comprise four side edges, a top surface and a bottom surface, and wherein during step (c), said flexible high-temperature sealant composition is applied to each of said four side edges, said top surface and said bottom surface.

10. The method of claim 6 wherein said flexible, high-temperature sealant composition is preformed as an elongated strip having a substantially circular cross-sectional shape.

* * * * *

UNITED STATES PATENT AND TRADEMARK OFFICE
CERTIFICATE OF CORRECTION

PATENT NO. : 8,231,128 B2
APPLICATION NO. : 12/752380
DATED : July 31, 2012
INVENTOR(S) : Morgan et al.

Page 1 of 1

It is certified that error appears in the above-identified patent and that said Letters Patent is hereby corrected as shown below:

In the Specifications:

At column 3, line 29, delete "sealant strip 28" and insert --sealant strip 30--

Signed and Sealed this
Thirteenth Day of November, 2012

David J. Kappos
*Director of the United States Patent and Trademark Office*